M. G. MELVIN.
FILTER.
APPLICATION FILED APR. 2, 1910.
981,582.
Patented Jan. 10, 1911.
2 SHEETS—SHEET 1.
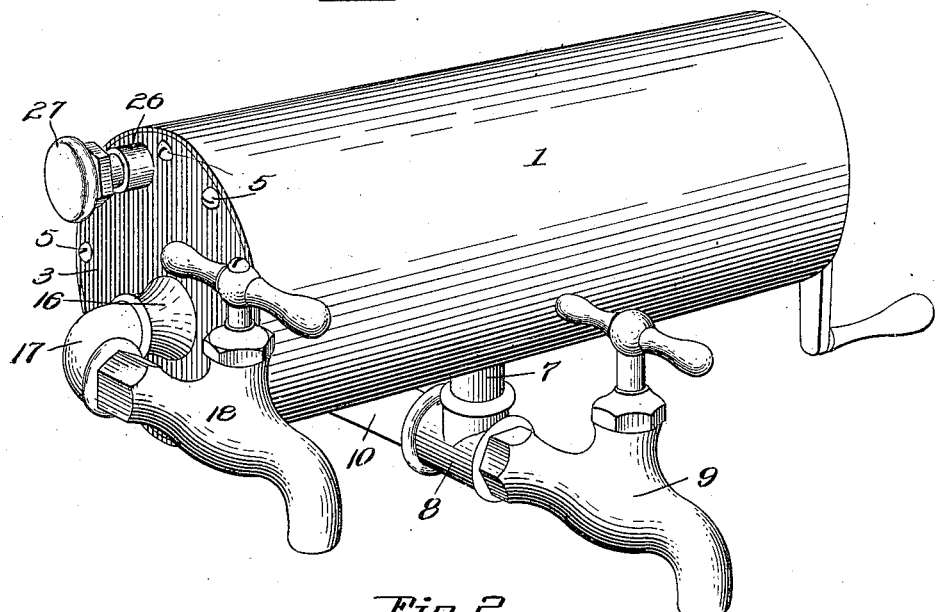
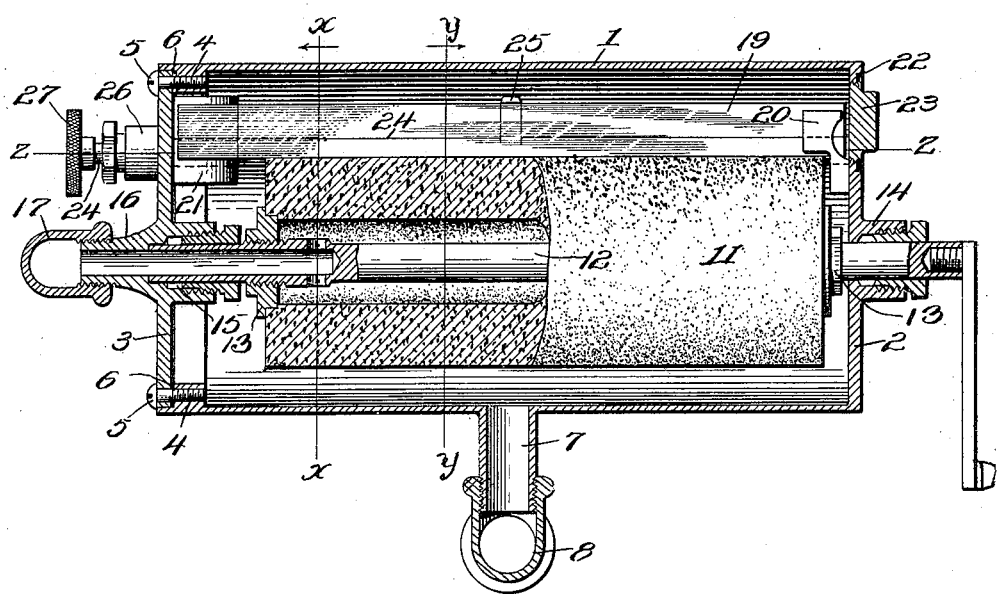
Witnesses
F. C. Gibson.
V. B. Hillyard.
Inventor
Mark G. Melvin.
By Victor J. Evans
Attorney M. G. MELVIN.
FILTER.
APPLICATION FILED APR. 2, 1910.
981,582.
Patented Jan. 10, 1911.
2 SHEETS—SHEET 2.
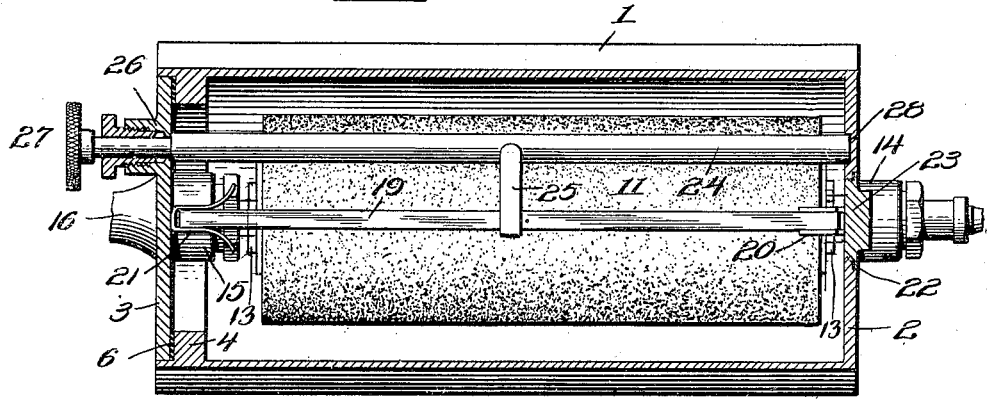
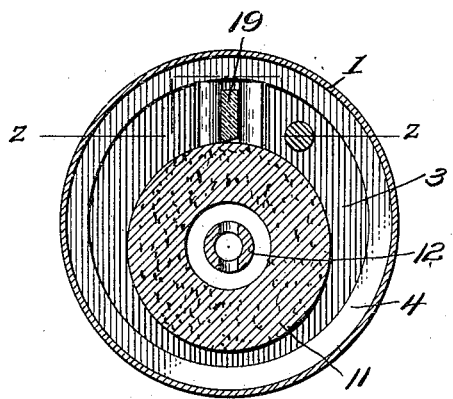
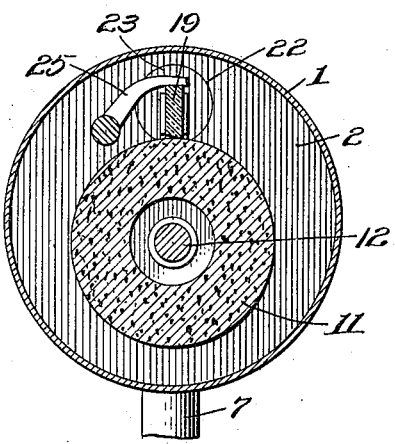
Inventor
Mark G. Melvin.
Witnesses
F. C. Gibson.
V. B. Hillyard.
By Victor J. Evans
Attorney

UNITED STATES PATENT OFFICE.

MARK G. MELVIN, OF SCRANTON, PENNSYLVANIA, ASSIGNOR, BY MESNE ASSIGNMENTS, TO STERLING SALES COMPANY, OF SCRANTON, PENNSYLVANIA, A CORPORATION OF DELAWARE.

FILTER.

981,582. Specification of Letters Patent. Patented Jan. 10, 1911.

Application filed April 2, 1910. Serial No. 552,993.

*To all whom it may concern:*

Be it known that I, MARK G. MELVIN, a citizen of the United States, residing at Scranton, in the county of Lackawanna and State of Pennsylvania, have invented new and useful Improvements in Filters, of which the following is a specification.

The present invention provides a contrivance for removing impurities from liquids, being adapted more particularly for filtering water used for drinking purposes, the filter being of the type which enables water to pass directly therethrough for general domestic use or to be filtered when required for table or drinking purposes, said filter embodying a rotary filtering medium and an adjustable scraper for removing impurities from the filtering medium, the appliance enabling the scraper to be pressed into contact with the filtering medium when turning the latter so as to insure removal of the impurities adhering thereto.

The invention consists of the novel features, details of construction and combination of parts, which hereinafter will be more particularly set forth, illustrated in the accompanying drawings, and pointed out in the appended claims.

Referring to the drawings, forming a part of the application, Figure 1 is a perspective view of a filtering device embodying the invention. Fig. 2 is a vertical central longitudinal section thereof. Fig. 3 is a horizontal section on the line *z—z* of Figs. 2 and 4. Fig. 4 is a cross section on the line *x—x* of Fig. 2, looking to the left. Fig. 5 is a transverse section on the line *y—y* of Fig. 2, looking to the right.

Corresponding and like parts are referred to in the following description, and indicated in all the views of the drawings, by the same reference characters.

The filtering device comprises a drum or hollow body 1, which is closed at one end by a fixed head 2 and at its opposite end by a removable head 3, the latter being secured to a collar 4 provided upon the inner side of the drum 1 by means of machine screws 5. A gasket 6 is provided between the removable head 3 and collar 4 to insure the formation of a tight joint. The drum is provided with a nipple 7 to which a tee 8 is fitted. The nipple 7 preferably occupies a central position at the bottom or lowest point of the drum so as to be used for the twofold purpose of an inlet and a drain outlet. A faucet 9 is secured to one end of the tee fitting 8 and the supply pipe 10 connects with the opposite end of the tee 8. When the faucet 9 is closed the water from the supply pipe passes directly into the drum. Upon opening the faucet 9 the water passes directly from the supply pipe through the faucet. When the faucet 9 is open any impurities contained in the bottom of the drum pass off.

The filtering medium 11 may be of any construction and consists of a cylinder of stone or porous material through which the water may seep and is mounted upon a pipe 12, which is journaled at its ends in bearings provided in the heads 2 and 3 of the drum. The end of the pipe 12 mounted in the fixed head 2 is closed, whereas the opposite end is open. Cap pieces 13 are threaded upon opposite end portions of the pipe 12 and close openings formed in opposite ends of the filtering medium or cylinder 11, the edges of the cap pieces being rabbeted so as to snugly fit the enlarged portions formed in the ends of the filtering cylinder 11.

Stuffing boxes 14 and 15 are provided upon the heads 2 and 3 and insure the formation of a tight joint between said heads and the ends of the pipe 12 journaled therein. The stuffing box 14 is upon the outer side of the head 2, whereas the stuffing box 15 is provided upon the inner side of the removable head 3. A nipple or coupling end 16 is provided upon the outer side of the head 3 in line with the stuffing box 15 and an L-fitting 17 is coupled thereto. A faucet 18 is secured to the L-fitting 17 and enables filtered water to be drawn from the appliance when required.

The filtering cylinder 11 is arranged eccentrically within the drum and below the center thereof, this being of advantage as it enables the scraper to be located in the upper portion of the drum and to rest upon the filtering cylinder by gravity.

The scraper 19 preferably consists of a strip or bar of glass which is supported in vertical position upon the topmost portion of the filtering cylinder and is retained in place by means of guides 20 and 21. The guide 20 is provided upon the inner side of the fixed head 2. The guide 21 is provided upon the inner side of the removable head 3 and its side members flare so as to direct the scraper into position when slipping the same into place through an opening 22 formed in the fixed head 2 opposite the upper portion of the guide 20 and which opening is closed by means of a plug 23 threaded therein. Upon removal of the plug 23 the scraper 19 may be removed through the opening 22 or placed in position. While the weight of the scraper 19 may ordinarily be sufficient to effect removal of mud and other impurities from the filtering cylinder 11 upon rotating the latter, it may be desirable to apply pressure to the scraper to insure a thorough removal of the impurities from the surface of the filtering cylinder so that the water may pass readily therethrough during the filtering process.

To effect the result just mentioned a rod 24 is mounted at its ends in the heads 2 and 3 and is provided at a central point with a curved finger 25, which extends over the scraper 19. The rod 24 extends through a stuffing box 26 provided upon the outer side of the removable head 3 and its projecting end has a button 27 which is grasped when it is required to turn the rod to cause the finger 25 to press downwardly upon the scraper 19. The inner end of the rod 24 is mounted in a depression 28 formed in the inner side of the head 2. The rod 24 is located in the upper portion of the drum to one side of the guides 20 and 21. The finger 25 inclines upwardly and forwardly with its terminal portion overhanging the scraper 19 so as to exert a downward pressure thereon upon turning the rod 24 in a clockwise direction.

The filter is adapted to be connected to the outlet of a service pipe, the water passing into the drum directly from said service pipe and is purified by passing through the walls of the filtering cylinder 11 into the space inclosed within said filtering cylinder. When filtered water is required for any purpose it is drawn from the faucet 18. Unfiltered water may be drawn directly through the faucet 9. When it is required to clean the filtering cylinder the latter is rotated by the application of a suitable tool to the projecting end of the pipe 12, pressure being applied to the scraper 19 by turning the rod 24. The mud, slime, and other impurities removed from the outer surface of the filtering cylinder 11 collect in the bottom of the drum and upon opening the faucet 9 the impurities are drawn off with the water passing through said faucet and at the same time a portion of the water from the supply pipe 10 is diverted into the drum 1 and serves to thoroughly wash the same and the filtering cylinder, thereby carrying off all impurities. When the water drawn off from the faucet 9 is clear it is known that the filter has been thoroughly cleansed and is in condition for further use in the manner stated.

From the foregoing description, taken in connection with the accompanying drawings, the advantages of the construction and of the method of operation will be readily apparent to those skilled in the art to which the invention appertains, and while I have described the principle of operation of the invention, together with the device which I now consider to be the embodiment thereof, I desire to have it understood that the device shown is merely illustrative, and that such changes may be made when desired as are within the scope of the claims appended hereto.

Having thus described the invention what is claimed as new, is:—

1. A filter substantially as specified comprising a drum closed at its ends by heads and provided with an opening constituting both an inlet and an outlet, a filtering cylinder located within the drum and journaled to the heads of the drum below a central line, a faucet for drawing off filtered water from the filtering cylinder, a scraper mounted upon the filtering cylinder, guides secured to the inner faces of the heads of the drum for retaining the scraper in place, a rod mounted in the heads of the drum to one side of the guides and having an end projecting and provided with a button constituting a finger piece, and a finger projecting from the rod and overhanging the scraper to exert a pressure upon the latter when turning the rod.

2. A filter comprising a drum having a fixed head at one end and having a collar near the opposite end, a removable head fitted within the open end of the cylinder and secured to the inner collar thereof, both heads having stuffing boxes below a central line, the stuffing box upon the fixed head being upon the outer side and the stuffing box of the removable head being provided upon the inner side thereof, a filtering cylinder, a pipe passing centrally through the filtering cylinder and secured thereto and journaled at its ends in the stuffing boxes provided upon the heads of the drum, a faucet for drawing off the filtered water secured to the removable head of the drum, a tee fitting connected to the lower portion of the drum and adapted to have the supply pipe secured to one end thereof, a faucet applied to the opposite end of said tee fitting, and a scraper mounted in the upper portion of the drum upon the filtering cylinder and retained in place by guides applied to the inner sides of the heads of the drum.

3. In a filter of the character described, the combination of a drum, a filtering cylinder located within the drum, a scraper supported upon the filtering cylinder within the drum, guides provided upon the heads of the drum to retain the scraper in place, one of the guides having its side members flared, and the head of the drum provided with the other guide having an opening opposite the scraper to admit of the latter being placed in position or removed, a plug for closing said opening, a rod located upon one side of the guides and mounted in the heads of the drum, one end of the rod projecting and provided upon its outer end with a button, and a finger extended from the rod and curving over the scraper.

In testimony whereof I affix my signature in the presence of two witnesses.

MARK G. MELVIN.

Witnesses:
MARCUS J. DUGGAN,
ALFRED J. WILLIAMS.